US005344170A

United States Patent [19]
Ochoa

[11] Patent Number: 5,344,170
[45] Date of Patent: Sep. 6, 1994

[54] BICYCLE SEAT ASSEMBLY

[76] Inventor: Adam A. Ochoa, 1211 N. Miller Rd., Scottsdale, Ariz. 85257

[21] Appl. No.: 971,320

[22] Filed: Nov. 4, 1992

[51] Int. Cl.$^5$ .................................................. B62J 1/02
[52] U.S. Cl. .................................. 280/283; 297/209; 280/275
[58] Field of Search ............... 280/283, 275; 297/209, 297/208

[56] References Cited

U.S. PATENT DOCUMENTS

| 1,092,407 | 4/1914 | Smith | 280/283 |
| 2,623,573 | 12/1952 | Gaetano | 280/283 |
| 3,989,263 | 11/1976 | Stuck et al. | 280/283 |
| 4,182,508 | 1/1980 | Kallai et al. | 280/283 |
| 5,094,424 | 3/1992 | Hartway | 280/283 |

FOREIGN PATENT DOCUMENTS 868262  12/1941  France ................................. 280/283

Primary Examiner—Margaret A. Focarino
Assistant Examiner—Kevin Hurley
Attorney, Agent, or Firm—Tod R. Nissle

[57] ABSTRACT

A bicycle seat assembly permits a bicycle seat to rotate or be laterally displaced short distances in order to absorb movement by the user's body and to increase the comfort of the user while riding a bicycle.

4 Claims, 3 Drawing Sheets

BICYCLE SEAT ASSEMBLY

This invention relates to bicycles.

More particularly, the invention relates to a bicycle seat shock absorbing system which permits a bicycle seat to rotate or be laterally displaced short distances in order to absorb movement by the body of a rider and to increase the comfort of the rider.

Various bicycle seat assemblies are well known in the art for absorbing the shocks produced when a bicycle travels over rough terrain. See, for example U.S. Pat. Nos. 2,623,573 to Gaetano, 1,092,407 to Smith, 3,989,263 to Stuck et al., and 5,094,424 to Hartway. One disadvantage of most prior art systems is that the bicycle seat is not permitted to rotate or move side-to-side small distances in order to absorb and compensate for movement of a rider which occurs while a bicycle is being used. U.S. Pat. No. 3,989,263 to Stuck et al. does, however, disclose a system which permits the rotation of a bicycle seat. In the Stuck et al. system a relatively stiff flat band 5 is used to anchor the bicycle seat to the bicycle frame. See FIG. 2 of the Stuck et al. patent. The band 5 is flexible enough to permit the bicycle seat to rotate, but band 5 is, at the same time, sufficiently rigid to continuously return the bicycle seat to a normal centered position. The disadvantage of the band 5 is that it tends to over correct the bicycle seat, and cause the seat to overshoot, oscillate about, and "hunt" for its normal centered position. Further, the strap is only useful in permitting the rotational, and not lateral, movement of the bicycle seat.

Accordingly, it would be highly desirable to provide an improved bicycle seat assembly which permitted small incremental rotational and lateral movements of a bicycle seat while preventing the seat from "hunting", overshooting, and oscillating about the normal central position of the seat.

Therefore, it is a principal object of the invention to provide an improved bicycle seat assembly.

A further object of the invention is to provide an improved bicycle seat assembly which permits a bicycle seat to move rotatably and laterally through small selected distances.

Another object of the invention is to provide an improved bicycle seat assembly which minimizes wear and extends the operational life of a bicycle seat which laterally and rotatably moves during use of a bicycle.

Still a further object of the invention is to provide an improved bicycle seat assembly of the type described which facilitates movement of a bicycle seat by pivoting the bicycle seat assembly about a selected axis in the seat post mast.

These and other, further and more specific objects and advantages of the invention will be apparent to those skilled in the art from the following detailed description thereof, taken in conjunction with the drawings, in which.

Figure 1:
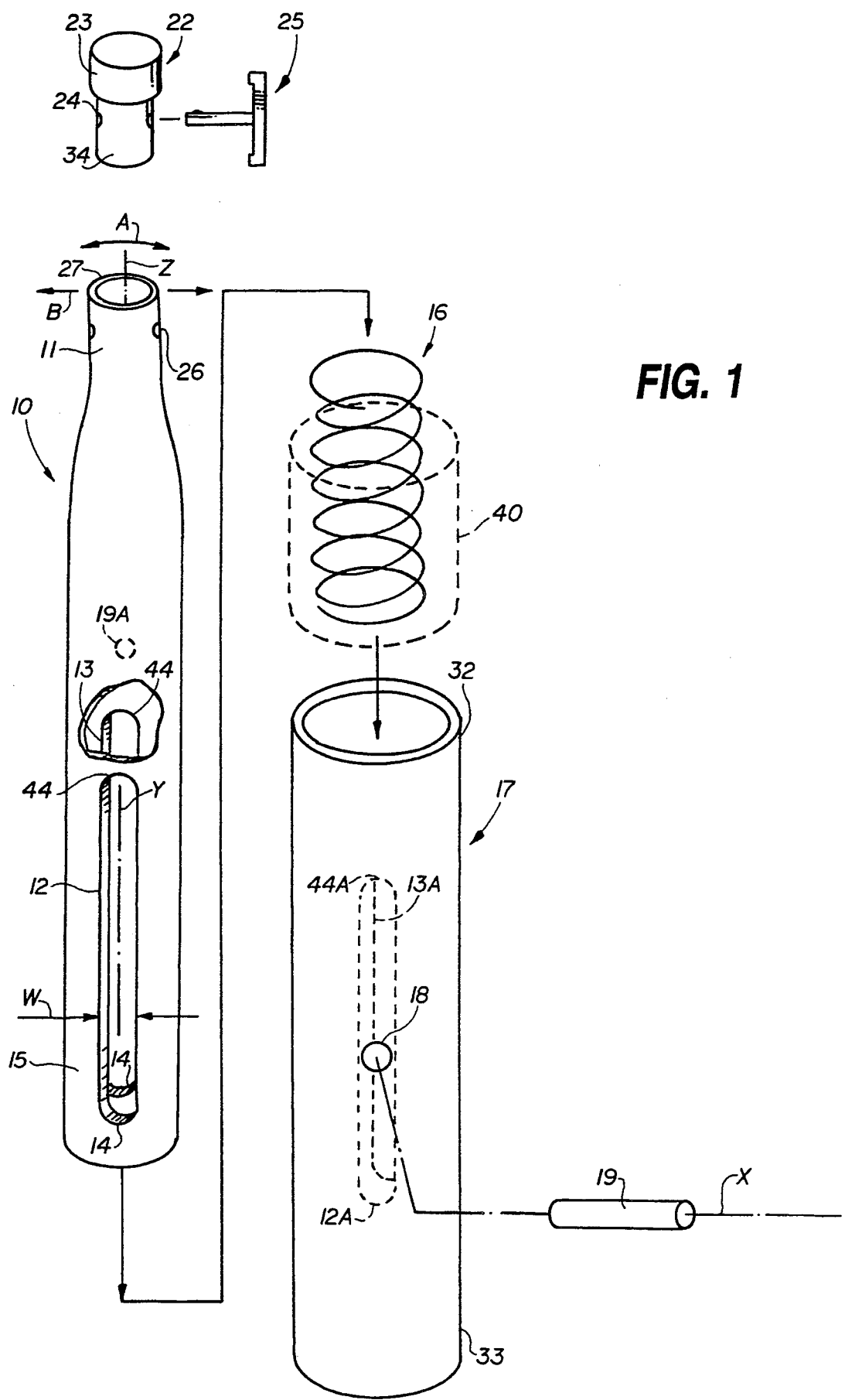
FIG. 1 is an exploded assembly view of a bicycle seat shock absorbing post constructed in accordance with the principles of the invention.

Briefly in accordance with my invention, I provide an improved bicycle seat. The bicycle seat has an elongate tubular seat post mast, and includes an attachment member. The attachment member extends outwardly from the seat and is normally secured to the seat post mast. The seat post mast has a longitudinal axis. The improvement comprises a seat supporting shock absorbing seat post. The seat post includes an elongate tube having an upper end and a lower end. The tube is slidably disposed within the seat post mast and is adjustable to various fixed positions with respect thereto. An elongate member is rotatably disposed in the elongate tube. The elongate member has a distal end normally extending out of and spaced away from the upper end of the elongate tube, and shaped to receive the attachment member of the bicycle seat. At least one opening is formed in the pair consisting of the tube and the elongate member. The opening includes at least one peripheral edge which bounds and defines the opening. Pin means extends through the opening and is fixed in one of the tube and elongate member. The opening is larger than the pin means to permit the elongate member and the bicycle seat to rotate in the tube about the longitudinal axis of the seat post mast until the pin means contacts the peripheral edge of the opening.

In accordance with another embodiment of my invention, I provide an improved bicycle seat. The bicycle seat has an elongate tubular seat post mast, and includes an attachment member. The attachment member extends outwardly from the seat and is normally secured to the seat post mast. The seat post mast has a longitudinal axis. The improvement comprises a seat supporting shock absorbing seat post. The seat post includes an elongate tube having an upper end and a lower end. The tube is slidably disposed within the seat post mast and is adjustable to various fixed positions with respect thereto. An elongate member is rotatably disposed in the elongate tube. The elongate member has a distal end normally extending out of and spaced away from the upper end of the elongate tube, and shaped to receive the attachment member of the bicycle seat. At least one opening is formed in the pair consisting of the tube and the elongate member. Pin means extends through the opening and is fixed in one of the tube and elongate member. The elongate member is sized to permit the elongate member to move laterally in the tube with respect to the pin means so that the bicycle seat can move laterally with respect to the longitudinal axis of the seat post mast.

In a further embodiment of my invention, I provide an improved bicycle. The bicycle includes a seat having an elongate tubular seat post mast. The seat includes an attachment member extending outwardly from the seat and normally secured to the seat post mast. The seat post mast has an longitudinal axis. The improvement comprises a seat supporting shock absorbing seat post. The seat post includes an elongate tube having an upper end and lower end and slidably disposed within the seat post mast and adjustable to various fixed positioned with respect thereto; an elongate member slidably rotatably pivotally disposed in the upper end of the elongate tube, the elongate member having a distal end normally extending out of and spaced away from the upper end of the elongate tube and shaped to receive the attachment member of the bicycle seat; spring means adjacent the lower end of the tube and contacting and normally urging the elongate member upwardly; at least one slot formed in one of the pair consisting of the tube and the elongate member, the slot having a longitudinal axis, opposing sides, and a lower end and an upper end; pin means slidably extending through the slot and fixed in one of the first tube and the second tube, the pin means having a longitudinal axis, the spring means normally urging the second tube upwardly such that one of the lower end and the upper end of the slot is forced against the pin means. The longitudinal axes of the slot and the pin means generally lie in a common plane passing through the longitudinal axis of the seat post mast and through a line indicating the normal forward direction of travel of the bicycle.

Figure 2:
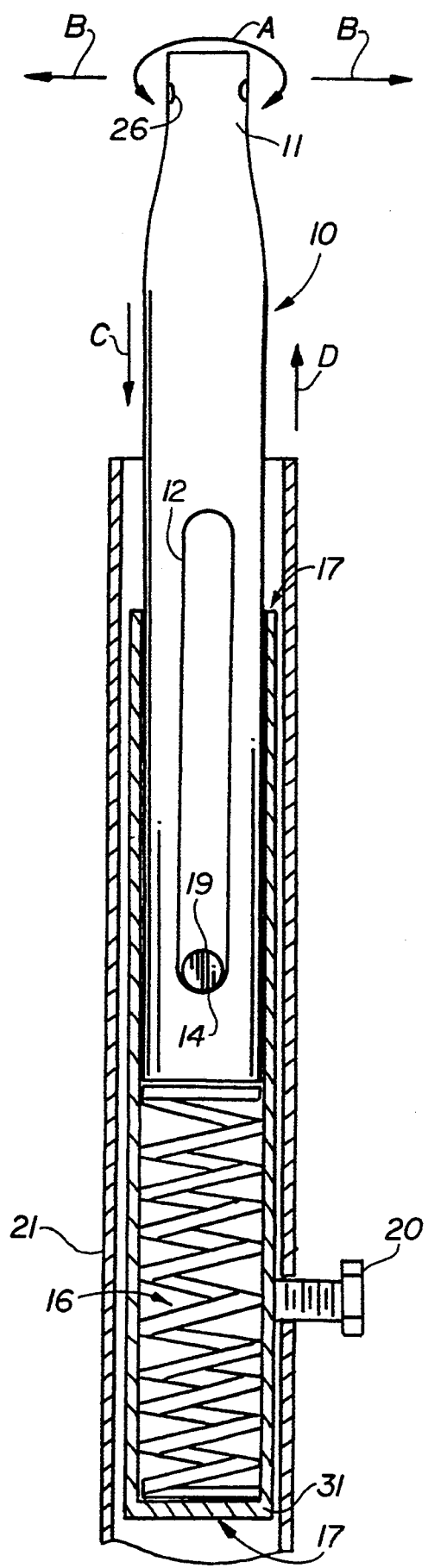
FIG. 2 is a partial section view of the bicycle seat shock absorbing post of FIG. 1; and, FIG. 3 is an elevation view illustrating a bicycle seat assembly including the shock absorbing post of FIGS. 1 and 2.
Figure 3:
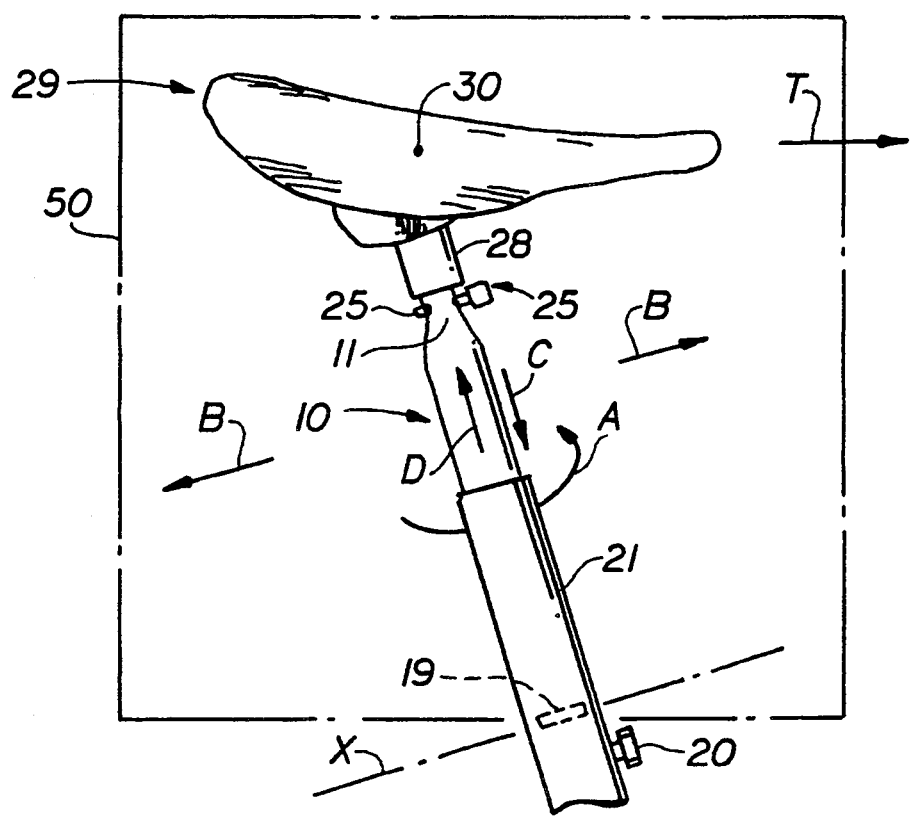

Turning now to the drawings, which depict the presently preferred embodiments of the invention for the purpose of illustrating the practice thereof and not by way of limitation of the scope of the invention, and in which like reference characters refer to corresponding elements throughout the several views, FIGS. 1 to 3 illustrate a bicycle seat assembly constructed in accordance with the principles of the invention and including a hollow bicycle seat post mast 21 secured to the frame (not shown) of a bicycle, a seat 29, and a hollow tubular attachment member 28 attached to and outwardly extending from said seat 29. The member 28 utilized in the embodiment of the invention illustrated in FIGS. 1 to 3 is relatively short. In conventional bicycles, member 28 ordinarily is longer and, as would be appreciated by those of skill in the art, the seat assembly of the invention can be adapted to utilize a member 28 having a greater length. If, for example, the quick release member 22 and pin 25 are not utilized, then upper end 11 of elongate member 10 can take the place of member 28 and be attached directly to a bracket or other attachment means on the bottom of seat 29 such that member 10 takes the place of member 28.

The seat supporting shock absorbing post of the invention is illustrated in detail in FIGS. 1 and 2 and includes elongate tube 17 having an upper end 32 and lower end 33. Tube 17 is normally slidably positioned and disposed in the seat post mast 21 and is secured in any of various fixed positions along mast 21 by set screw 20. Spring 16 is slidably inserted inside tube 17 and rests in the lower end 33 of tube 17 beneath openings 18. A pair of equal sized openings 18 are formed in tube 17, each opening 18 being of equal size and in an opposing side of tube 17. Openings 18 each receive one end of pin 19. Pin 19 extends across the hollow tube 17.

Elongate member 10 includes a distal end 11, proximate end 15, and longitudinal axis Y. End 15 is slidably received by tube 17 and rests on the upper end of spring 16 in the manner illustrated in FIG. 2. Distal end 11 normally extends out of and is spaced away from the upper end 32 of tube 17. Distal end 11 is adapted to receive the attachment member 28 of the bicycle seat 29. Fastener 22, opposing apertures 26, and quick release pin 25 are used to adapt end 11 to receive fastener 22. Any desired means can be utilized to adapt end 11 to receive fastener 22 or to receive seat 29. Fastener 22 includes cylindrical head 23 attached to cylindrical neck 34. Elongate cylindrical aperture 24 formed through neck 34 slidably receives quick release pin 25. Head 23 is slidably fixedly received inside of hollow member 28. Neck 34 is shaped and dimensioned to be slidably inserted in end 11 such that aperture 24 aligns with opposing apertures 26 and quick release pin 25 can be inserted through said aligned apertures to releasably secure fastener 22 and seat 30 to distal end 11.

Opposing, parallel slots 12 and 13 are formed in member 10. Slots 12 and 13 are of equal shape and dimension and each includes a U-shaped bottom portion 14 and U-shaped upper portion 44. When tube 17, member 10, spring 16, and pin 19 are assembled in the manner depicted in FIGS. 2 and 3, spring 16 is compressed and forces member 10 upwardly in the direction of arrow D such that the bottom portions 14 of slots 12 and 13 are pressed against fixed pin 19. When a bicycle rolls downwardly off of a curb and hits the street beneath the curb, the jolt and the weight of the rider generate a downward force against seat 29 in the direction of arrow C which forces the proximate end 15 of member 10 against and, when the magnitude of the downward force is sufficient, further compresses spring 16. When spring 16 is further compressed, member 10 slides along inside tube 17 in the direction of arrow C, and slots 12 and 13 slide downwardly over stationary pin 19. After spring 16 absorbs the downward force C generated when the bicycle rolls off of the curb onto the street, compressed spring 16 expands back to the normal operative position illustrated in FIG. 2 and presses the bottom portions 14 of slots 12 and 13 against fixed pin 19.

As would be appreciated by those of skill in the art, in an alternate embodiment of the invention, slots 12 and 13 can be formed 12A, 13A in tube 17 and pin 19 can be fixedly mounted 19A in member 10 such that the ends of pin 19A extend outwardly from member 10 in a direction normal to axis Y (FIG. 1) and extend into slots 12A and 13A formed in tube 17. In this alternate embodiment, spring 16 would, in contrast to the embodiment of the invention shown in FIG. 2, press the ends of pin 19A against the upper portions 44A of slots 12A and 13A. Further, in this alternate embodiment of the invention, when member 10 is downwardly displaced in the direction of arrow C to further compress spring 16, pin 19A is fixed in and moves simultaneously with member 10 and the ends of pin 19A slid along slots 12A and 13A formed in tube 17 and slide downwardly away from upper portions 44a. Slots 12A and 13A are in fixed position and do not move when member 10 is downwardly displaced to further compress spring 16. After spring 16 absorbs the forces generated when the bicycle rolls off of a curb or over other rough terrain, spring 16 expands to again force member 10 upwardly and press the ends of pin 19A against the upper portions 44A of slots 12A and 13A. Consequently, in both this alternate embodiment of the invention and the embodiment of the invention illustrated in FIG. 2, when a bicycle is moving over smooth ground, spring 16 is compressed and upwardly displaces member 10 to maintain it in a fixed position either with pin 19A bearing against the upper portions 44A of a pair of slots 12A and 13A (when the slots are formed in tube 17 and the pin 19A is carried by member 10) or with the lower portions 14 of slots 12 and 13 (when the slots are formed in member 10 and the pin 19 is fixedly secured in tube 17 in the manner illustrated in FIGS. 1 and 2) bearing against pin 19 in the manner illustrated in FIG. 2.

In FIG. 2, the width W of slots 12 and 13 is slightly greater, typically 0.001 to 0.010 inch greater and preferably at least 0.002 to 0.005 inch greater, than the diameter of pin 19. The greater width of slots 12 and 13 with respect to pin 19 is important in the practice of the invention because it permits member 10 and, consequently, seat 29 to rotate through small arcs of travel in the directions indicated by arrow A. Such small arcs of travel increase the comfort of a person riding a bicycle because they permit the seat 29 to give as the rider imperceptibly rocks from side to side as first one and then the other foot of the rider reaches its lowest point of travel. Similarly, the outer diameter of the proximate end 15 of member 10 is slightly less, typically 0.001 to 0.010 inch less and preferably at least 0.002 to 0.005 inch less, than the inner diameter of tube 17. The lesser diameter of end 15 with respect to the inner diameter of tube 17 is important in the practice of the invention because it permits member 10 and seat 29 to laterally rock from side to side in the directions indicated by arrows B in FIGS. 1 and 2. Such lateral displacement of seat 29 has also been found to significantly increase the comfort of the rider of the bicycle. Such an increase in comfort is believed, again, to derive from the fact that the small lateral movements of seat 29 in the directions indicated by arrows B help the body of the rider to adapt to body movements which naturally occur when first one and then the other foot of the rider reaches its lowest (or highest) point of travel on the pedal of the bicycle. When member 10 rocks from side to side in tube 17, member 10 pivots about pin 19, both in directions which lie in a first plane which is perpendicular to the longitudinal axis of pin 19 and in directions which lie in a second plane which is parallel to the longitudinal axis of pin 19, or, in directions having components of travel lying in each of said first and second planes.

In order to reduce wear between pin 19 and slots 12 and 13, it is important that the longitudinal axis X of pin 19 in FIG. 3 generally lie in a first plane which is coplanar with or is parallel to the reference plane 50 passing through the forward direction of travel of the bicycle indicated by arrow T and through the longitudinal axis Y of member 10 and tube 17. When pin 19 is in this orientation, the lateral displacement or rocking of member 10 in directions B which lie in a plane parallel to said reference plane and to the axis X of pin 19 produces little wear as slots 12 and 13 slide over pin 19. When the longitudinal axis X of pin 19 lies in said first plane, then the longitudinal axes of slots 12 and 13 are parallel to axis Y and to said reference plane.

In one presently preferred embodiment of the invention, the overall length of the assembled shock absorbing seat post of FIG. 2 about 13 inches. The overall length of the seat post is the length from bottom plate 31 of tube 17 to the distal end 11 of member 10 when the post is in the configuration shown in FIG. 2 with the bottom portions 14 of the slots 12 and 13 forced against pin 19. The height of head 23 is about one inch. The outer diameter of member 10 is about seven-eighths of an inch and the outer diameter of tube 17 is about one inch. The shape and dimension of the components of the seat post can be varied as desired.

In use of the shock absorbing seat post of FIGS. 1 and 2, the seat post is assembled to the configuration shown in FIG. 2. Head 23 of member 22 is slid into hollow member 28 and fixedly secured therein with adhesive, a bolt, or other fastening means (not shown in the drawings). Neck 34 is slidably inserted in distal end 11 of member 10 until apertures 24 and 26 are aligned. Quick release fastener 25 is inserted through apertures 24 and 26 to secure member 22 and seat 29 to member 10. Tube 17 is slid into mast 21 and secured in position with set screw 20 in the manner illustrated in FIG. 2. After tube 17 is secured in mast 21, the bicycle seat assembly of the invention has the configuration illustrated in FIG. 3. When a rider using the bicycle seat assembly shown in FIG. 3 rolls off of a curb, an incremental downward seat is generated by the weight of the rider against seat 29. This incremental force is, after the front wheel (or back wheel) of the bicycle falls off of the curb and down through the air under the force of gravity, generated when the front wheel hits the street surface beneath the curb. The incremental force causes spring 16 to further compress, and seat 29 to be displaced in, the direction indicated by arrow C in FIG. 3. After spring 16 absorbs the incremental force, spring 16 expands and returns member 10 to the position illustrated in FIG. 2. The magnitude of the incremental force necessary to further compress spring 16 in the direction of arrow C can be selected as desired. It is presently preferred that the magnitude be sufficiently large such that a relatively forceful jolt, such as the jolt generated when a bicycle rolls off of a curb, is required before seat 29 will be downwardly displaced in the direction of arrow C. If spring 16 is too "soft" and only small incremental forces are required, the constant up-and-down motion of seat 29 which is generated as the rider traverses minor bumps along a roadway is tiring to the rider.

When a rider is utilizing the bicycle seat assembly of FIG. 3, movement of the body of the rider on seat 29 causes seat 29 to be laterally displaced in the directions indicated by arrows B because the outer diameter of end 15 of member 10 is less than the inside diameter of tube 17, which permits member 10 to pivot about pin 19 and tilt back-and-forth in tube 17 in the manner earlier described. Further, movement of the body of the rider on seat 29 causes seat 29 to rotate about the longitudinal axis Y of member 10 and tube 17 because the width W of slots 12 and 13 is greater than the diameter of pin 19 such that pin 19 can move short distances from side to side in slots 12 and 13. Pin 19 moves in slots 12 and 13 in a plane which is normal to axis Y.

An inner cylindrical TEFLON polytetrafluoroethylene sleeve 40 can be fixedly inserted inside and against the upper end 32 of or elsewhere along the inner cylindrical surface of tube 17 to reduce any friction and any resulting wear between tube 17 and member 10. When a TEFLON polytetrafluoroethylene sleeve is inserted, the inner diameter of the sleeve preferably is slightly greater, typically 0.0005 to 0.010 inch and preferably 0.002 to 0.005 inch, greater than the outer diameter of end 15 of member 10. One advantage of the TEFLON polytetrafluoroethylene sleeve 40 is that it is resilient and compresses slightly to facilitate the lateral movement of member 10 in the directions of arrows B. Resilient materials other than TEFLON polytetrafluoroethylene can be utilized in a sleeve mounted in place along the inner cylindrical surface of tube 17 intermediate tube 17 and member 10.

Having described my invention in such terms as to enable those skilled in the art to understand and practice it, I claim:

1. In combination with a bicycle seat assembly including a seat, an elongate tubular seat post mast, and an attachment member extending outwardly from said seat and normally secured to said seat post mast, said seat post mast having a longitudinal axis, the improvement comprising a seat supporting shock absorbing seat post, said seat post including (a) an elongate tube having an inner diameter, an upper end and a lower end and slidably disposed within said seat post mast and adjustable to various fixed positions with respect thereto;

(b) an elongate member having a proximate end rotatably disposed in said elongate tube, said proximate end having an outer diameter less than said inner diameter of said elongate tube, said elongate member having a distal end normally extending out of and spaced away from said upper end of said elongate tube and shaped to receive said attachment member of the bicycle seat;

(c) at least one opening formed in one of the pair consisting of said tube and said elongate member, said opening having a width and including at least one peripheral edge bounding and defining said opening;

(d) a pin having a diameter and extending through said opening and fixed in one of said tube and said elongate member, said pin being fixed in said tube when said opening is formed in said elongate member, said pin being fixed in said elongate member when said opening is formed in said tube, said diameter of said pin being less than said width of said opening;

wherein said opening is larger than said pin and is oriented with respect to said pin to permit said elongate member and the bicycle seat to rotate in said tube about said longitudinal axis until said pin contacts said peripheral edge of said opening.

2. In combination with a bicycle seat assembly including a seat, an elongate tubular seat post mast, and an attachment member extending outwardly from said seat and normally secured to said seat post mast, said seat post mast having a longitudinal axis, the improvement comprising a seat supporting shock absorbing seat post, said seat post including (a) an elongate tube having a selected inner diameter, an upper end and a lower end and slidably disposed within said seat post mast and adjustable to various fixed positions with respect thereto;

(b) an elongate member having a proximate end pivotally disposed in said elongate tube, said proximate end having an outer diameter less than said inner diameter of said elongate tube, said elongate member having a distal end normally extending out of and spaced away from said upper end of said elongate tube and shaped to receive said attachment member of the bicycle seat;

(c) at last one opening formed in one of the pair consisting of said tube and said elongate member said opening having a width;

(d) a pin having a diameter and extending through said opening and fixed in one of said elongate tube and said elongate member said pin being fixed in said tube when said opening is formed in said elongate member, said pin being fixed in said elongate member when said opening is formed in said tube, said diameter of said pin being less than said width of said opening;

wherein said elongate member is sized to permit said elongate member to move from side to side in said tube and to pivot in said tube with respect to said pin to move said elongate member and bicycle seat laterally with respect to said longitudinal axis of said seat post mast.

3. In combination with a bicycle seat assembly including a seat, an elongate tubular seat post mast, and an attachment member extending outwardly from said seat and normally secured to said seat post mast, said seat post mast having a longitudinal axis, the improvement comprising a seat supporting shock absorbing seat post, said seat post including (a) an elongate tube having a selected inner diameter, an upper end and a lower end and slidably disposed within said seat post mast and adjustable to various fixed positions with respect thereto;

(b) an elongate member having a proximate end slidably rotatably pivotally disposed in said upper end of said elongate tube, said proximate end having an outer diameter less than said inner diameter of said elongate tube, said elongate member having a distal end normally extending out of and spaced away from said upper end of said elongate tube and shaped to, receive said attachment member of the bicycle seat;

(c) spring means adjacent said lower end of said tube and contacting and normally urging said elongate member upwardly;

(d) at least one slot formed in one of the pair consisting of said tube and said elongate member, said slot having a width, a longitudinal axis, opposing sides and a lower end and an upper end;

(e) a pin having a diameter and slidably extending through said slot and fixed in one of said elongate tube and said elongate member, said pin having a longitudinal axis, said spring means normally urging said elongate member upwardly such that one of said lower end and said upper end of said slot is forced against said pin, said pin being fixed in said tube when said opening is formed in said elongate men%her, said pin being fixed in said elongate member when said opening is formed in said tube, said diameter of said pin being less than said width of said opening;

said longitudinal axes of said slot and said pin means generally lying in a common plane passing through said longitudinal axis of said seat post mast and through a line indicating the normal forward direction of travel of the bicycle.

4. In combination with a bicycle seat assembly including a seat, an elongate tubular seat post mast, and an attachment member extending outwardly from said seat and normally secured to said seat post mast, said seat post mast having a longitudinal axis, the improvement comprising a seat supporting shock absorbing seat post, said seat post including (a) an elongate tube having an inner diameter, an upper end and a lower end and slidably disposed within said seat post mast and adjustable to various fixed positions with respect thereto;

(b) an elongate member having a proximate end rotatably disposed in said elongate tube, said proximate end having an outer diameter less than said inner diameter of said elongate tube, said elongate member having a distal end normally extending out of and spaced away from said upper end of said elongate tube and shaped to receive said attachment member of the bicycle seat;

(c) at least one opening formed in one of the pair consisting of said tube and said elongate member, said opening having a width and including at least one peripheral edge bounding and defining said opening;

(d) a pin extending through said opening and fixed in one of said tube and said elongate member, said pin being fixed in said tube when said is formed in said elongate member, said pin being fixed in said elongate member when said opening is formed in said tube, said diameter of said pin being less than said width of said opening; and, (e) quick release means for attaching said attachment member to said upper end.

* * * * *